(12) United States Patent
Liao

(10) Patent No.: US 7,866,685 B2
(45) Date of Patent: Jan. 11, 2011

(54) GOLF CART COLLAPSIBLE DEVICE

(75) Inventor: Gordon Liao, Yung Kang (TW)

(73) Assignee: Unique Product & Design Co., Ltd., Yung kang (TW)

( * ) Notice: Subject to any disclaimer, the term of this patent is extended or adjusted under 35 U.S.C. 154(b) by 410 days.

(21) Appl. No.: 12/131,321

(22) Filed: Jun. 2, 2008

(65) Prior Publication Data

US 2009/0295130 A1 Dec. 3, 2009

(51) Int. Cl.
*B62B 3/02* (2006.01)

(52) U.S. Cl. .................................... 280/651

(58) Field of Classification Search ............... 280/35, 280/38–40, 43.13, 47, 62, 641–642, 646–47, 280/651, 654–55, DIG. 6; 248/95–98; *B62B 3/02, B62B 3/12*
See application file for complete search history.

(56) References Cited

U.S. PATENT DOCUMENTS

| 4,784,401 | A | * | 11/1988 | Raguet | 280/40 |
| 7,128,333 | B2 | * | 10/2006 | Reimers et al. | 280/651 |
| 7,137,644 | B2 | * | 11/2006 | Kimberley | 280/651 |

* cited by examiner

*Primary Examiner*—J. Allen Shriver, II
*Assistant Examiner*—James Triggs
(74) *Attorney, Agent, or Firm*—Alan Kamrath; Kamrath & Associates PA

(57) ABSTRACT

A golf cart collapsible device includes a frame folding articulation, a linking mechanism, a four-bar linkages mechanism, a front wheel, two rear wheels and a locking mechanism. Thus, the front wheel and the rear wheels are folded and expanded simultaneously by driving the upper frame, so that the golf cart is folded and expanded easily, quickly and conveniently. In addition, the front wheel and the rear wheels can be folded and expanded simultaneously, so that the user needs not to hunker or bend his/her body to fold and expand the front wheel individually, thereby greatly facilitating the user folding and expanding the golf cart.

13 Claims, 7 Drawing Sheets

GOLF CART COLLAPSIBLE DEVICE

BACKGROUND OF THE INVENTION

1. Field of the Invention

The present invention relates to a collapsible device and, more particularly, to a collapsible device for a golf cart.

2. Description of the Related Art

A conventional golf cart collapsible device in accordance with the prior art shown in FIG. 7 comprises a first foldable articulation 11 mounted between an upper frame 1 and a lower frame 2 for folding the upper frame 1, a connecting base 12 mounted on a mediate portion of the lower frame 2 for pivotally mounting two rear wheel frames 14, two rear wheels 10 mounted on the two rear wheel frames 14 respectively, two pull bars 15 each mounted between the upper frame 1 and a respective one of the two rear wheel frames 14 so that the two rear wheel frames 14 are movable in concert with the upper frame 1, a second foldable articulation 13 mounted between the lower frame 2 and a front wheel frame 21 for folding a front wheel 20.

Thus, the upper frame 1 and the two rear wheel frames 14 are connected by the two pull bars 15 so that when the upper frame 1 is folded, the two rear wheels 10 are moved backward to fold the two rear wheels 10 and the upper frame 1 simultaneously. However, the front wheel 20 and the two rear wheels 10 are folded independently and cannot be folded simultaneously, so that a user has to hunker or bend his/her body to operate the second foldable articulation 13 to fold or expand the front wheel 20 so as to fold or expand the golf cart, thereby causing inconvenience to the user when folding or expanding the golf cart.

The closest prior art reference of which the applicant is aware was disclosed in WO-2006089410. However, a user has to hunker or bend his/her body to drive the front wheel 30 so as to fold or expand the golf cart, thereby causing inconvenience to the user when folding or expanding the golf cart. In addition, the rear wheel and the rear wheel frame are folded upward during the folding process, so that the rear wheel is located at the upper portion of the golf cart after the golf cart is folded, and the user needs to invert the golf cart through 180 degrees for standing the golf cart, thereby causing inconvenience to the user

BRIEF SUMMARY OF THE INVENTION

In accordance with the present invention, there is provided a golf cart collapsible device, comprising a frame folding articulation mounted between an upper frame and a lower frame for folding the upper frame; a linking mechanism mounted between the upper frame and the lower frame and including a connecting base mounted on an upper end of the lower frame, two rear wheel frames each having a first end pivotally connected with the connecting base and a second end provided with a rear wheel, a golf bag base mounted on a lower end of the lower frame, a slide movably mounted on the lower frame, two pull bars each mounted between the slide and a respective one of the two rear wheel frames so that the two rear wheel frames are movable in concert with the slide, and a first link mounted between the frame folding articulation and the slide so that the slide is movable in concert with the upper frame; a front wheel; a four-bar linkages mechanism mounted between the golf bag base of the linking mechanism and the front wheel for folding the front wheel; and a second link hidden in the lower frame and connected with the frame folding articulation and the four-bar linkages mechanism, so that the four-bar linkages mechanism is movable in concert with the upper frame. Thus, the upper frame is driven to drive the linking mechanism, the second link and the four-bar linkages mechanism to fold the front wheel and the rear wheels simultaneously.

The primary objective of the present invention is to provide a golf cart collapsible device that is folded and expanded easily and quickly.

Another objective of the present invention is to provide a collapsible device for a golf cart, wherein the front wheel and the two rear wheels are folded and expanded simultaneously by driving the upper frame, so that the golf cart is folded and expanded easily, quickly and conveniently.

A further objective of the present invention is to provide a collapsible device for a golf cart, wherein the front wheel and the two rear wheels can be folded and expanded simultaneously, so that the user needs not to hunker or bend his/her body to fold and expand the front wheel individually, thereby greatly facilitating the user folding and expanding the golf cart.

A further objective of the present invention is to provide a collapsible device for a golf cart, wherein the golf cart will stand automatically after the golf cart is folded so that the user needs not to invert the golf cart through 180 degrees for standing the golf cart.

A further objective of the present invention is to provide a collapsible device for a golf cart, wherein the locking mechanism is operated easily and conveniently.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
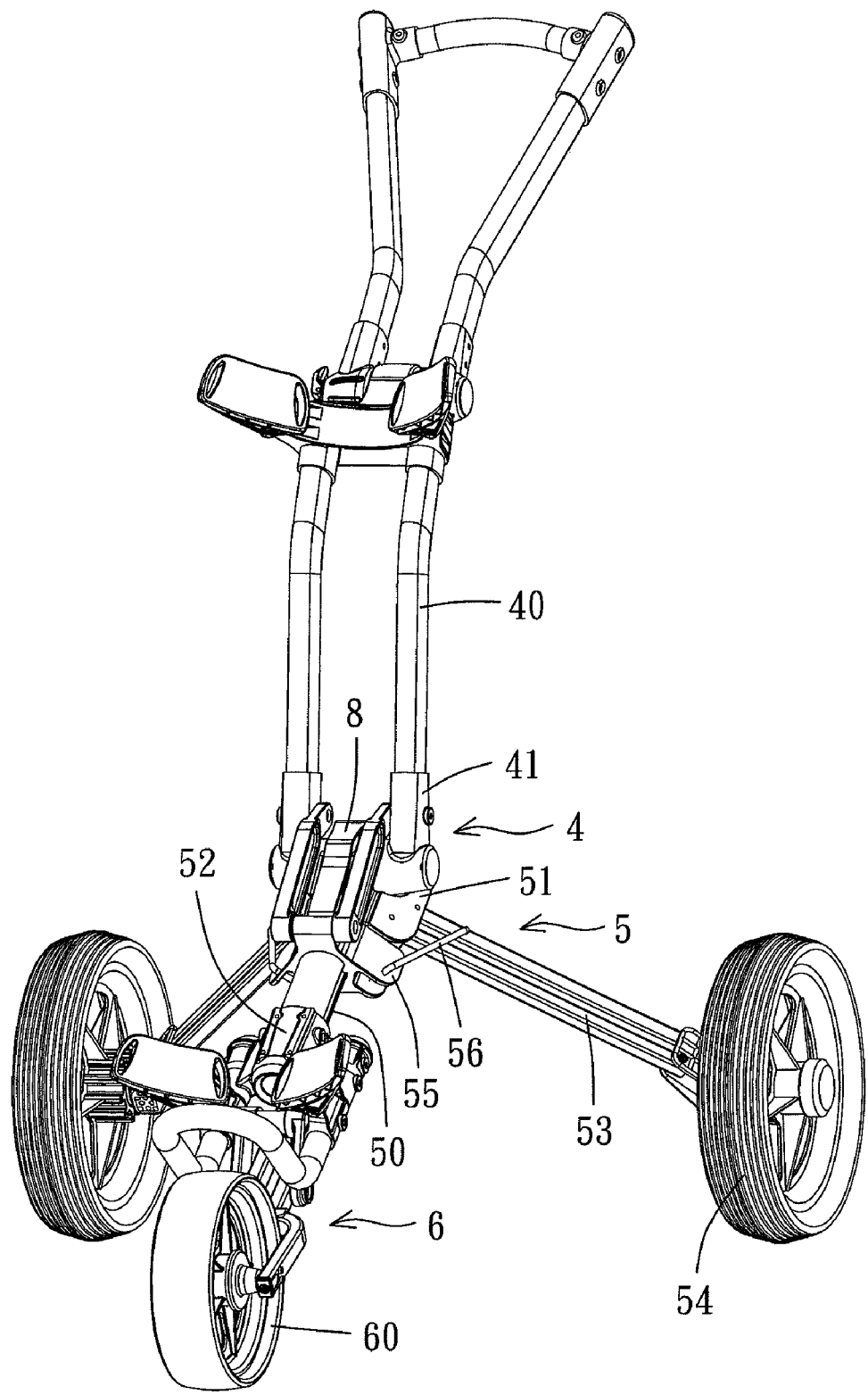
FIG. 1 is a perspective view of a collapsible device for a golf cart in accordance with the preferred embodiment of the present invention.
Figure 2:
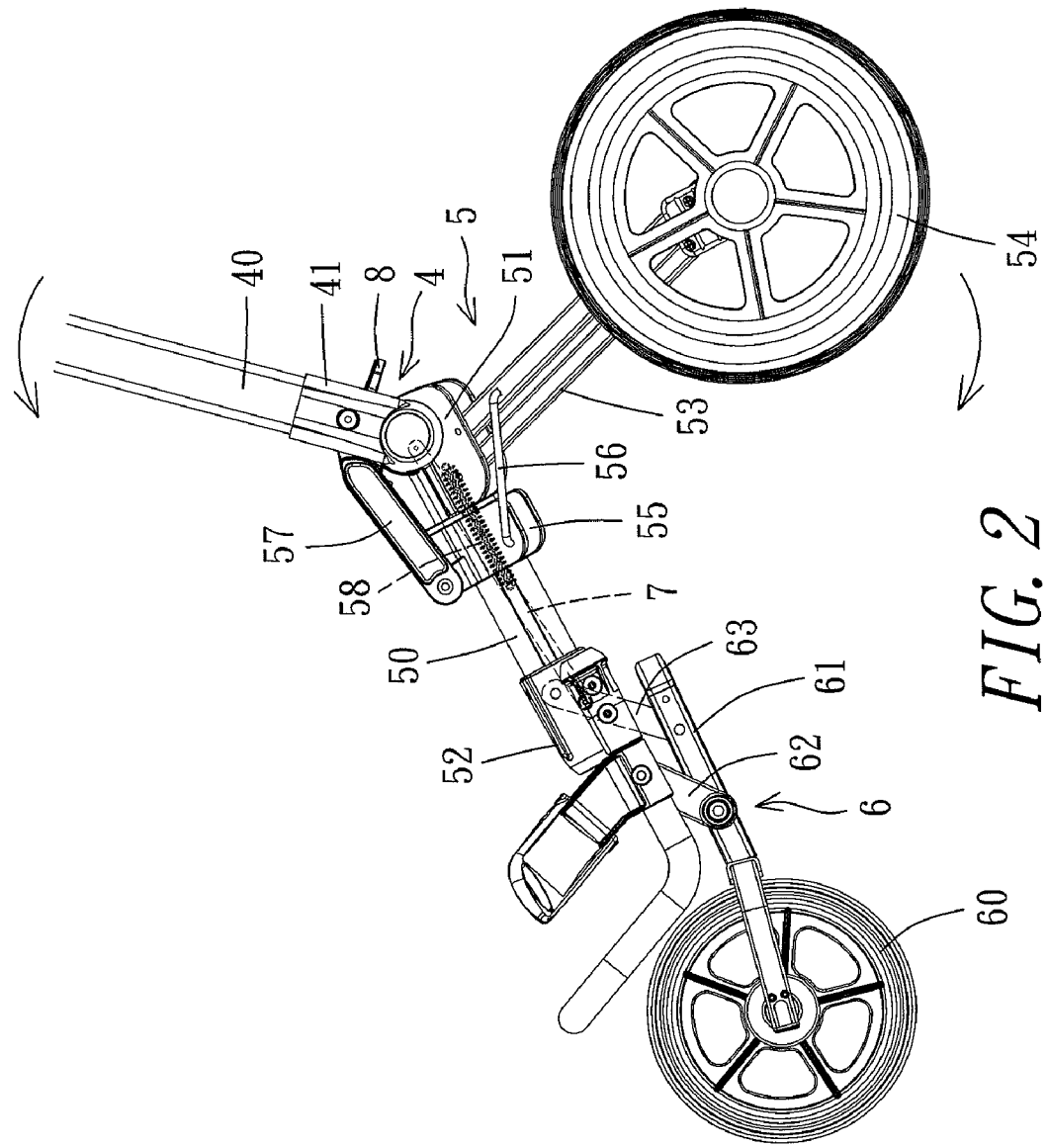
FIG. 2 is a side view of the collapsible device for a golf cart as shown in FIG. 1.
Figure 3:
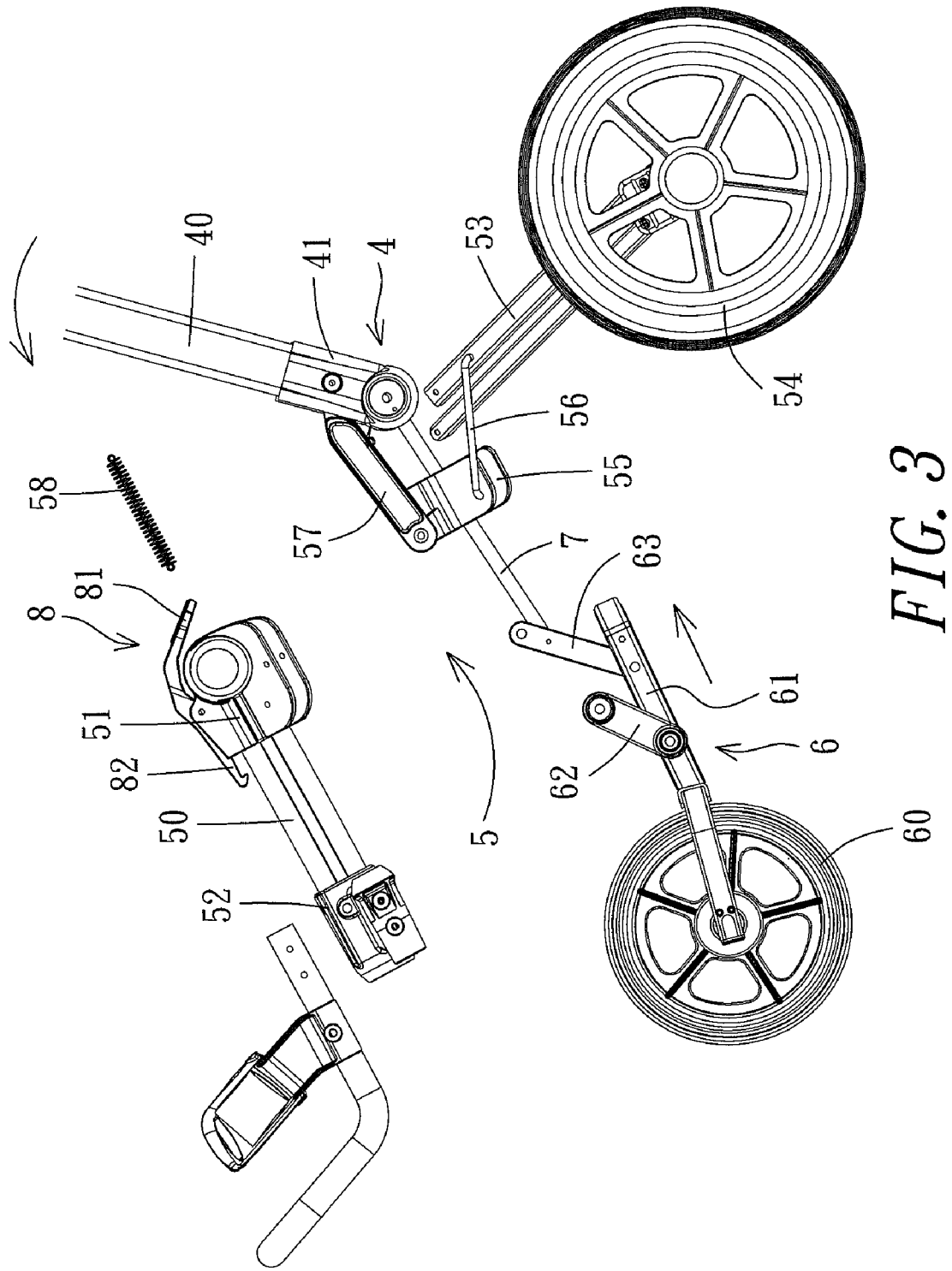
FIG. 3 is an exploded view of the collapsible device for a golf cart as shown in FIG. 2.

Referring to the drawings and initially to FIGS. 1-3, a collapsible device for a golf cart in accordance with the preferred embodiment of the present invention comprises a frame folding articulation 4 mounted between an upper frame 40 and a lower frame 50 for folding the upper frame 40. The frame folding articulation 4 is a rotating articulation or a collapsing articulation. In the preferred embodiment of the present invention, the frame folding articulation 4 is a rotating articulation and includes a rotation block 41 secured on a lower end of the upper frame 40.

The golf cart collapsible device further comprises a linking mechanism 5 mounted between the upper frame 40 and the lower frame 50. The linking mechanism 5 includes a connecting base 51 mounted on an upper end of the lower frame 50 and connected with the rotation block 41 of the frame folding articulation 4, two rear wheel frames 53 each having a first end pivotally connected with the connecting base 51 and a second end provided with a rear wheel 54, a golf bag base 52 mounted on a lower end of the lower frame 50, a slide 55 movably mounted on the lower frame 50, two pull bars 56 each mounted between the slide 55 and a respective one of the two rear wheel frames 53 so that the two rear wheel frames 53 are movable in concert with the slide 55, a first link 57 having a first end pivotally connected with the rotation block 41 of the frame folding articulation 4 and a second end pivotally connected with the slide 55 so that the slide 55 is movable in concert with the upper frame 40, and an elastic member 58 hidden in the lower frame 50 and having a first end secured on the slide 55 and a second end secured on the connecting base 51. Preferably, the elastic member 58 of the linking mechanism 5 is a spring.

The golf cart collapsible device further comprises a front wheel 60.

The golf cart collapsible device further comprises a four-bar linkages mechanism 6 mounted between the golf bag base 52 of the linking mechanism 5 and the front wheel 60 for folding the front wheel 60. The four-bar linkages mechanism 6 includes a front wheel frame 61 having an end provided with a front wheel 60, a front drive bar 62 having a first end secured on a rotation shaft of the golf bag base 52 of the linking mechanism 5 and a second end secured on a rotation shaft of the front wheel frame 61, and a rear drive bar 63 having a first end secured on another rotation shaft of the golf bag base 52 of the linking mechanism 5 and a second end secured on another rotation shaft of the front wheel frame 61.

The golf cart collapsible device further comprises a second link 7 hidden in the lower frame 50 and having a first end secured on a rotation shaft of the rotation block 41 of the frame folding articulation 4 and a second end secured on a rotation shaft of the rear drive bar 63 of the four-bar linkages mechanism 6, so that the rear drive bar 63 is movable in concert with the upper frame 40.

The golf cart collapsible device further comprises a locking mechanism 8 mounted on the linking mechanism 5. Preferably, the locking mechanism 8 is located above the connecting base 51 and the slide 55 of the linking mechanism 5 and pivotally mounted on an upper end of the connecting base 51 of the linking mechanism 5. The locking mechanism 8 is preferably a locking body and has a first end provided with a drive plate 81 and a second end provided with a locking hook 82 hooked on the slide 55 of the linking mechanism 5 so as to interlock the upper frame 40 and the lower frame 50.

Figure 4:
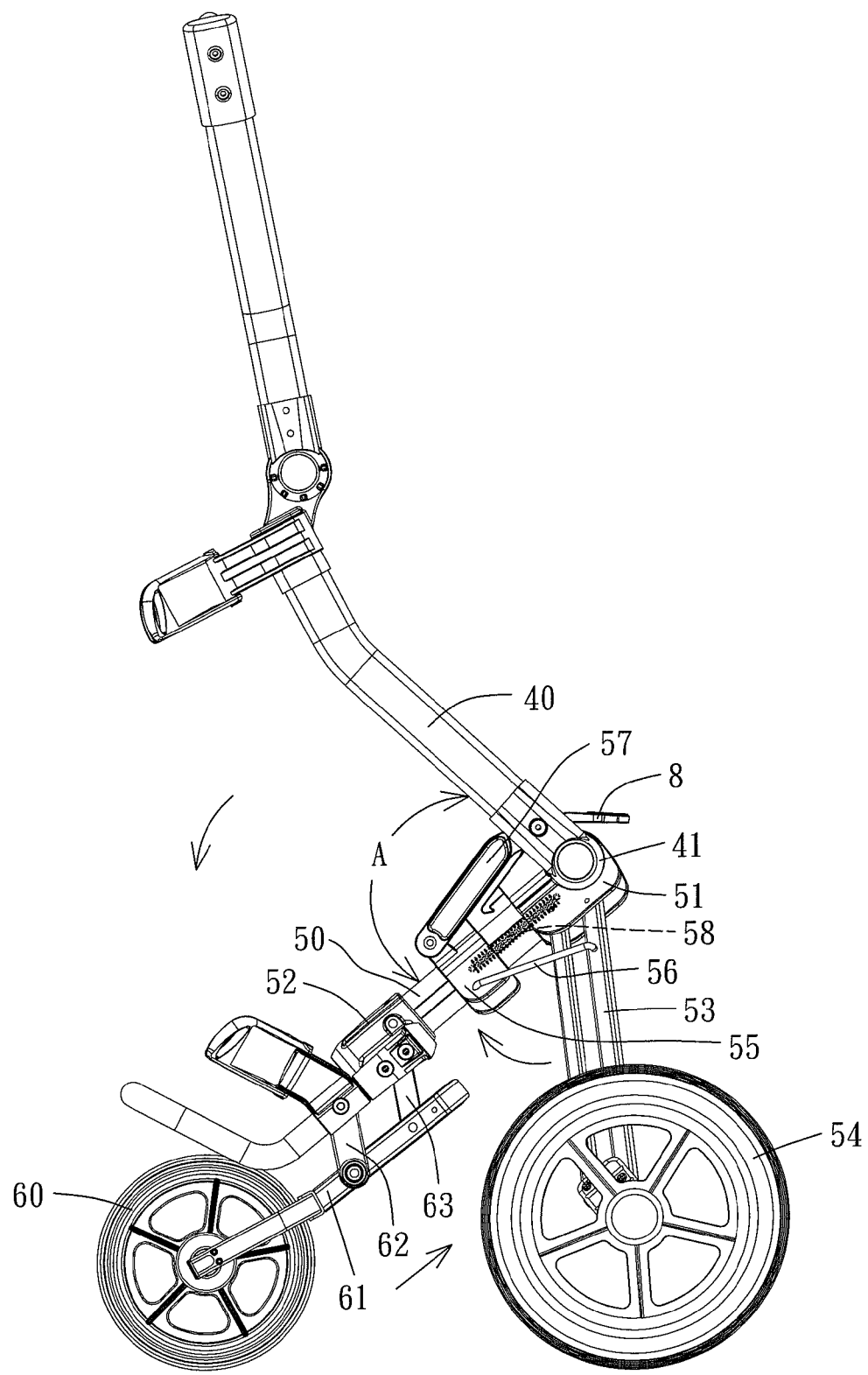
FIG. 4 is a schematic operational view of the collapsible device for a golf cart as shown in FIG. 2.
Figure 5:
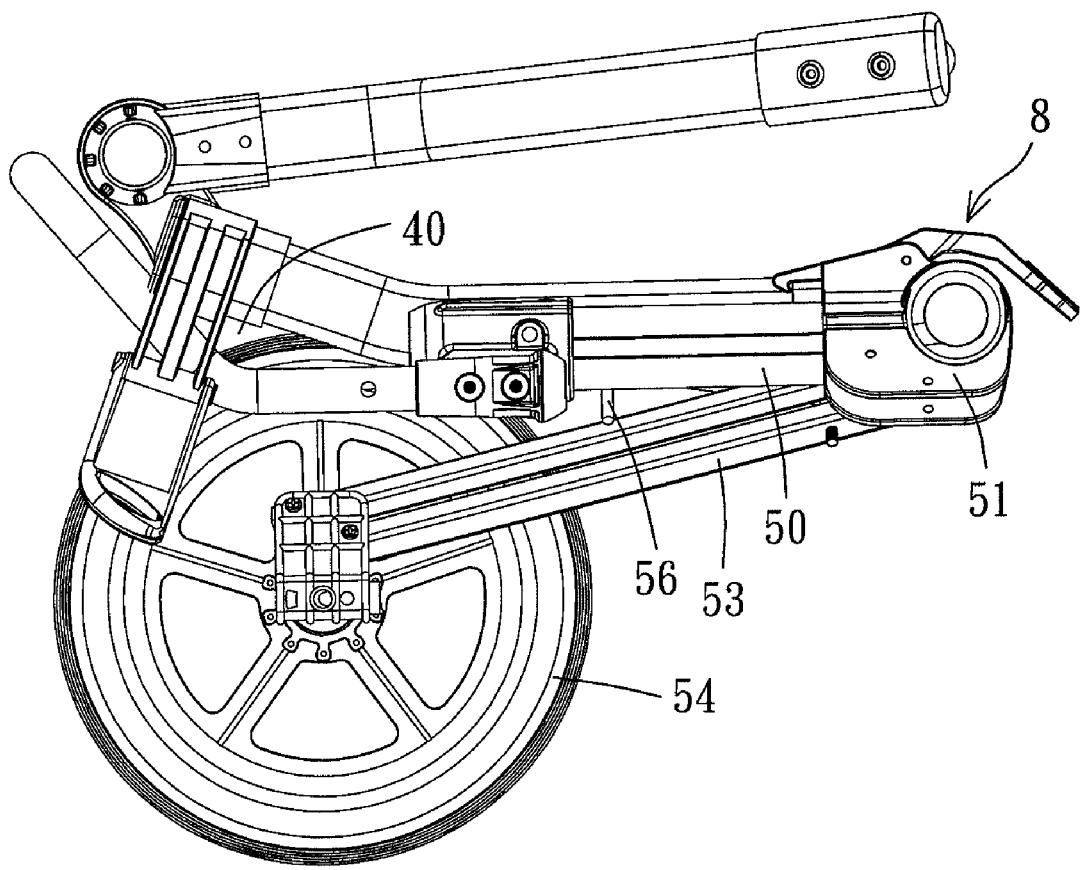
FIG. 5 is a schematic operational view of the collapsible device for a golf cart as shown in FIG. 4.
Figure 6:
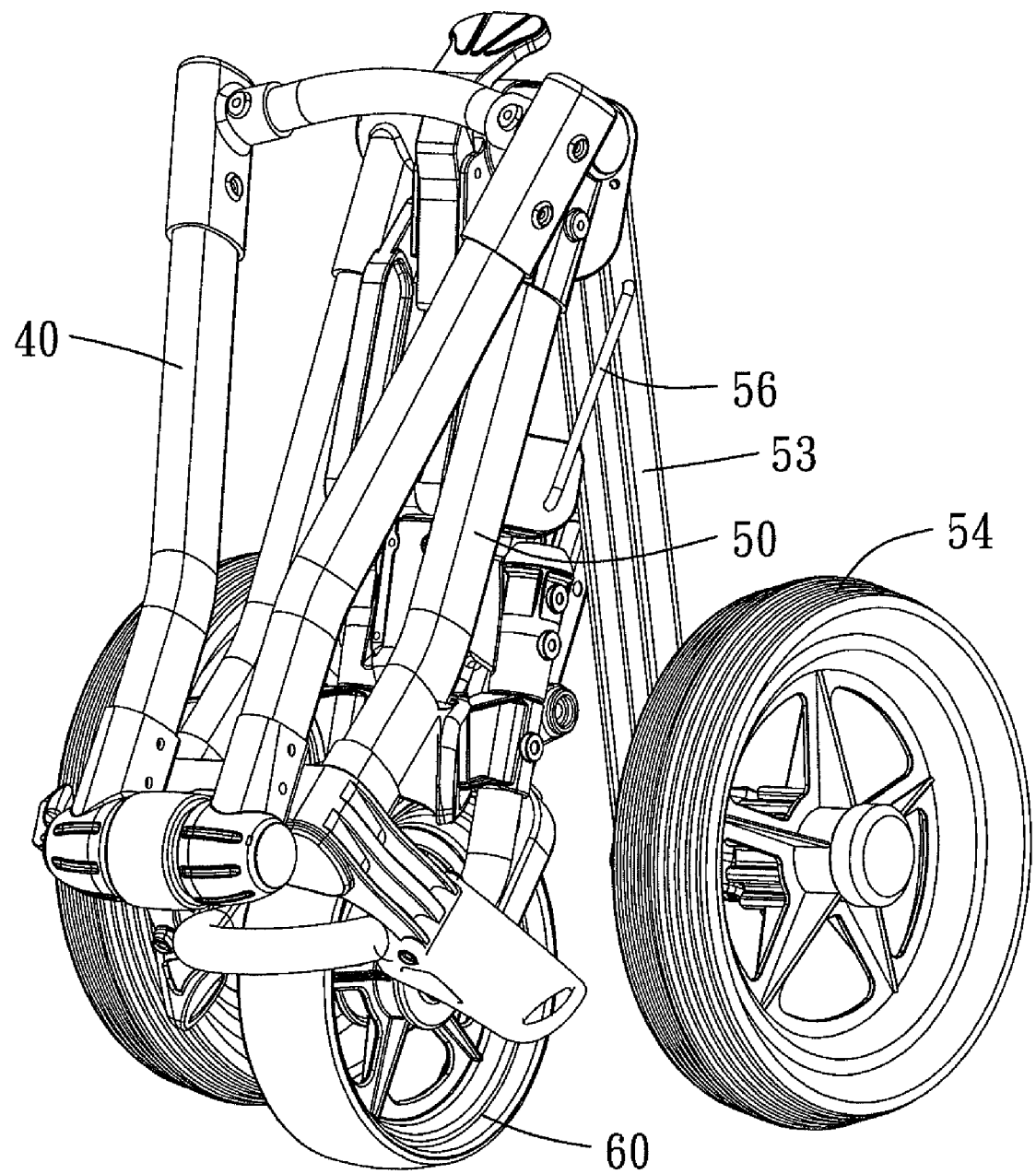
FIG. 6 is a folded view of the collapsible device for a golf cart as shown in FIG. 1.
Figure 7:
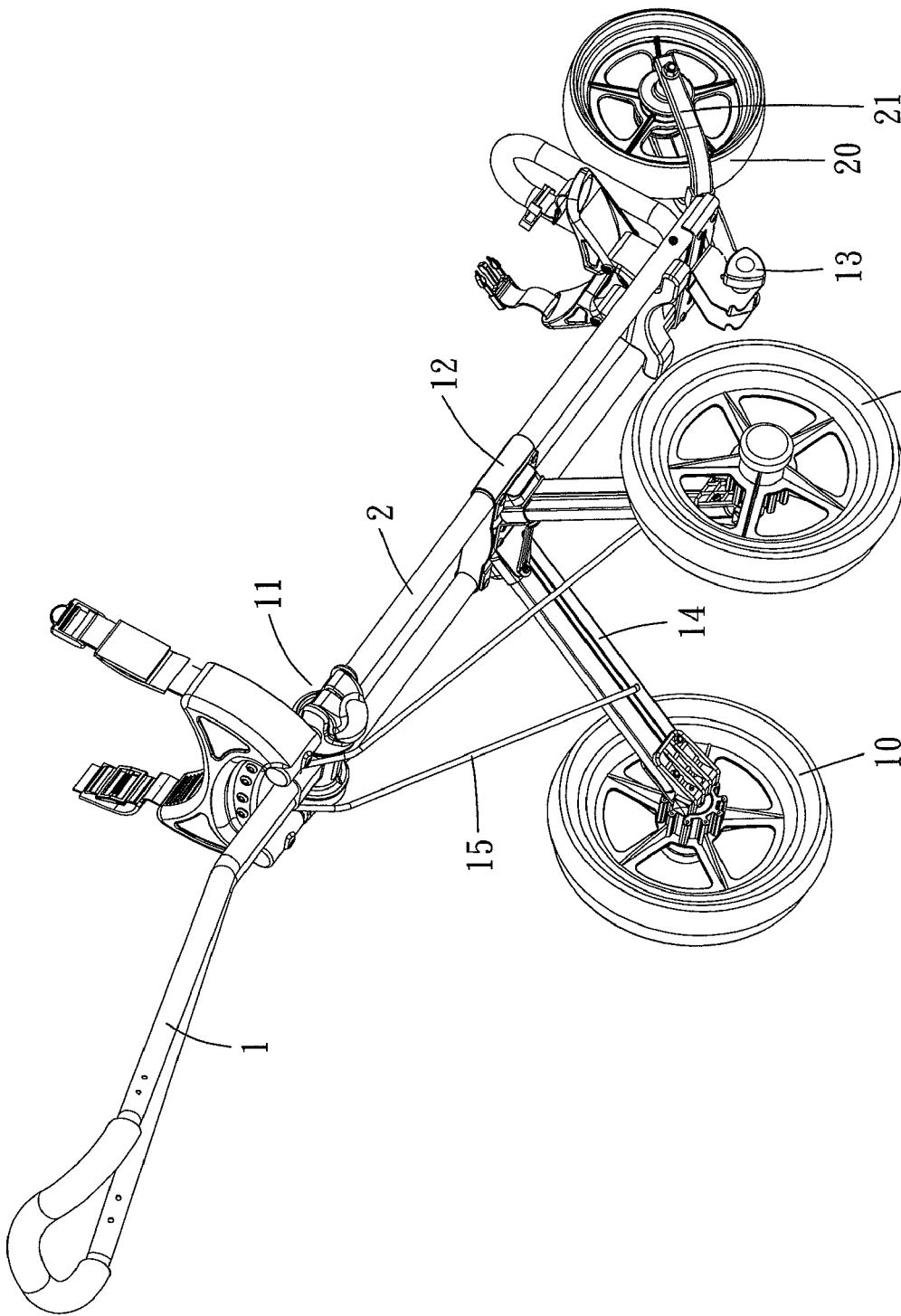
FIG. 7 is a perspective view of a conventional collapsible device for a golf cart in accordance with the prior art.

In operation, referring to FIGS. 4-6 with reference to FIGS. 1-3, when a user wishes to fold the golf cart, the locking hook 82 of the locking mechanism 8 is detached from the slide 55 of the linking mechanism 5 to unlock the locking mechanism 8 so as to release the upper frame 40 and the lower frame 50. Then, the upper frame 40 is driven to move forward and rotate downward to drive the rotation block 41 which drives the first link 57 which pushes the slide 55 to move forward on the lower frame 50. In such a manner, the slide 55 drives the two pull bars 56 which pull the two rear wheel frames 53 to move forward and rotate inward so that the two rear wheels 54 are moved forward and folded inward. At the same time, the rotation block 41 also drives the second link 7 to rotate upward simultaneously to drive the front drive bar 62 and the rear drive bar 63 to rotate rearward and to pull the front wheel frame 61 to move rearward so that the front wheel 60 is moved inward and is folded between the two rear wheels 54 as shown in FIG. 6.

On the contrary, when the user wishes to expand the golf cart, the upper frame 40 is driven to move rearward and rotate upward to drive the rotation block 41 which drives the first link 57 which pulls the slide 55 to move backward on the lower frame 50. In such a manner, the slide 55 drives the two pull bars 56 which push the two rear wheel frames 53 to move backward and rotate outward so that the two rear wheels 54 are moved backward and expanded outward. At the same time, the rotation block 41 also drives the second link 7 to rotate downward simultaneously to drive the front drive bar 62 and the rear drive bar 63 to rotate forward and to push the front wheel frame 61 to move forward so that the front wheel 60 is moved outward and is spaced from the two rear wheels 54 as shown in FIG. 2. Finally, the locking hook 82 of the locking mechanism 8 is hooked onto the slide 55 of the linking mechanism 5 to lock the locking mechanism 8 so as to interlock the upper frame 40 and the lower frame 50.

In conclusion, the front wheel 60 and the two rear wheels 54 are folded and expanded simultaneously by driving the upper frame 40, so that the golf cart is folded and expanded easily, quickly and conveniently. In addition, the front wheel 60 and the two rear wheels 54 can be folded and expanded simultaneously, so that the user needs not to hunker or bend his/her body to fold and expand the front wheel 60 individually, thereby greatly facilitating the user folding and expanding the golf cart.

As shown in FIGS. 4 and 5, the slide 55 is moved forward on the lower frame 50 during the folding process, so that the elastic member 58 of the linking mechanism 5 is lengthened, and the included angle "A" between the upper frame 40 and the lower frame 50 is reduced gradually. When the upper frame 40 and the lower frame 50 are parallel with each other, the included angle "A" between the upper frame 40 and the lower frame 50 is reduced to zero degree, while the upper frame 40, the lower frame 50, the slide 55 and the two pull bars 56 construct the starting point of the four-bar linkages mechanism 6.

Thus, when the upper frame 40 is folded downward successively from the starting point of the four-bar linkages mechanism 6, the included angle "A" between the upper frame 40 and the lower frame 50 is reduced successively to have a negative value, so that the four-bar linkages mechanism 6 produces a self-locking action to prevent the slide 55 from being pulled backward by the restoring force of the elastic member 58 of the linking mechanism 5.

In such a manner, the slide 55 is locked by the self-locking action of the four-bar linkages mechanism 6 so that the slide 55 will not be pulled backward by the restoring force of the elastic member 58 of the linking mechanism 5 to prevent the upper frame 40 and the lower frame 50 from being expanded automatically by the restoring force of the elastic member 58 of the linking mechanism 5.

On the contrary, when the upper frame 40 is expanded upward successively during the expanding process until the included angle "A" between the upper frame 40 and the lower frame 50 is greater than zero degree, the slide 55 is pulled backward by the restoring force of the elastic member 58 of the linking mechanism 5 to move toward the connecting base 51 so as to facilitate expanding of the upper frame 40 and the lower frame 50, so that the golf cart is expanded easily and quickly.

In addition, the two rear wheel frames 53 are moved forward and the front wheel 60 is moved backward during the folding process, so that the golf cart will stand automatically after the golf cart is folded as shown in FIG. 6 so that the user needs not to invert the golf cart through 180 degrees for standing the golf cart.

Accordingly, the front wheel 60 and the two rear wheels 54 are folded and expanded simultaneously by driving the upper frame 40, so that the golf cart is folded and expanded easily, quickly and conveniently. In addition, the front wheel 60 and the two rear wheels 54 can be folded and expanded simultaneously, so that the user needs not to hunker or bend his/her body to fold and expand the front wheel 60 individually, thereby greatly facilitating the user folding and expanding the golf cart. Further, the golf cart will stand automatically after the golf cart is folded so that the user needs not to invert the golf cart through 180 degrees for standing the golf cart. Further, the locking mechanism 8 is operated easily and conveniently.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A golf cart collapsible device, comprising:
   a frame folding articulation mounted between an upper frame and a lower frame for folding the upper frame;
   a linking mechanism mounted between the upper frame and the lower frame and including a connecting base mounted on an upper end of the lower frame, two rear wheel frames each having a first end pivotally connected with the connecting base and a second end provided with a rear wheel, a golf bag base mounted on a lower end of the lower frame, a slide movably mounted on the lower frame, two pull bars each mounted between the slide and a respective one of the two rear wheel frames so that the two rear wheel frames are movable in concert with the slide, and a first link mounted between the frame folding articulation and the slide so that the slide is movable in concert with the upper frame;
   a front wheel;
   a four-bar linkages mechanism mounted between the golf bag base of the linking mechanism and the front wheel for folding the front wheel;
   a second link hidden in the lower frame and connected with a rotational shaft of a rotational block of the frame folding articulation and a second end secured on a rotational shaft of a rear drive bar of the four-bar linkages mechanism, so that the four-bar linkages mechanism is movable in concert with the upper frame;
   wherein the upper frame is driven in a first rotational direction to drive the linking mechanism, the second link and the four-bar linkages mechanism to fold the front wheel and the rear wheels simultaneously.

2. The golf cart collapsible device in accordance with claim 1, wherein the frame folding articulation is a rotating articulation.

3. The golf cart collapsible device in accordance with claim 1, wherein the frame folding articulation is a collapsing articulation.

4. The golf cart collapsible device in accordance with claim 1, wherein
   the frame folding articulation includes a rotation block secured on a lower end of the upper frame;
   the connecting base of the linking mechanism is connected with the rotation block of the frame folding articulation.

5. The golf cart collapsible device in accordance with claim 1, further comprising a locking mechanism mounted on the linking mechanism.

6. The golf cart collapsible device in accordance with claim 1, wherein the linking mechanism further includes an elastic member hidden in the lower frame and having a first end secured on the slide and a second end secured on the connecting base.

7. The golf cart collapsible device in accordance with claim 1, wherein the four-bar linkages mechanism includes:
   a front wheel frame having an end provided with a front wheel;
   a front drive bar mounted between the golf bag base of the linking mechanism and the front wheel frame;
   a rear drive bar mounted between the golf bag base of the linking mechanism and the front wheel frame.

8. The golf cart collapsible device in accordance with claim 5, wherein the locking mechanism is a locking body and has a first end provided with a drive plate and a second end provided with a locking hook hooked on the slide of the linking mechanism so as to interlock the upper frame and the lower frame.

9. The golf cart collapsible device in accordance with claim 7, wherein
   the frame folding articulation includes a rotation block secured on a lower end of the upper frame;
   the second link has a first end secured on the rotation block of the frame folding articulation and a second end secured on the rear drive bar, so that the rear drive bar is movable in concert with the upper frame.

10. The golf cart collapsible device in accordance with claim 5, wherein the locking mechanism is located above the connecting base and the slide of the linking mechanism.

11. The golf cart collapsible device in accordance with claim 5, wherein the locking mechanism is pivotally mounted on an upper end of the connecting base of the linking mechanism.

12. The golf cart collapsible device in accordance with claim 1, wherein the first link has a first end pivotally connected with the frame folding articulation and a second end pivotally connected with the slide.

13. The golf cart collapsible device in accordance with claim 12, wherein
   the frame folding articulation includes a rotation block secured on a lower end of the upper frame;
   the first end of the first link of the linking mechanism is pivotally connected with the rotation block of the frame folding articulation.

* * * * *